US010975861B2

United States Patent
Duquennoy et al.

(10) Patent No.: US 10,975,861 B2
(45) Date of Patent: Apr. 13, 2021

(54) METERING MECHANISM FOR A PROPORTIONING PUMP, AND ASSOCIATED PUMP AND USAGE METHOD

(71) Applicant: DOSATRON INTERNATIONAL, Tresses (FR)

(72) Inventors: Philippe Duquennoy, Camarsac (FR); Richard Mahieux, Cursan (FR)

(73) Assignee: DOSATRON INTERNATIONAL, Tresses (FR)

( * ) Notice: Subject to any disclaimer, the term of this patent is extended or adjusted under 35 U.S.C. 154(b) by 119 days.

(21) Appl. No.: 16/317,458

(22) PCT Filed: Jul. 11, 2017

(86) PCT No.: PCT/EP2017/067354
§ 371 (c)(1),
(2) Date: Jan. 11, 2019

(87) PCT Pub. No.: WO2018/011185
PCT Pub. Date: Jan. 18, 2018

(65) Prior Publication Data
US 2019/0293066 A1    Sep. 26, 2019

(30) Foreign Application Priority Data

Jul. 13, 2016    (FR) ...................................... 1656774

(51) Int. Cl.
*F04B 49/18*    (2006.01)
*F04B 9/103*    (2006.01)
*F04B 13/02*    (2006.01)

(52) U.S. Cl.
CPC .............. *F04B 49/18* (2013.01); *F04B 9/103* (2013.01); *F04B 13/02* (2013.01); *F05B 2210/11* (2013.01)

(58) Field of Classification Search
CPC ...................... F04B 49/18; F04B 9/103; F04B 13/00–13/02; F05B 2210/11
See application file for complete search history.

(56) References Cited

U.S. PATENT DOCUMENTS

| 5,566,865 A | * | 10/1996 | Jouillat | ............... B05B 11/3007 222/287 |
| 6,027,319 A | * | 2/2000 | Winefordner | ......... F04B 33/005 417/440 |

(Continued)

FOREIGN PATENT DOCUMENTS

| EP | 1 971 774 A1 | 9/2008 |
| EP | 1 971 776 A1 | 9/2008 |

(Continued)

OTHER PUBLICATIONS

International Search Report, dated Oct. 17, 2017, from corresponding PCT application No. PCT/EP2017/067354.

*Primary Examiner* — Peter J Bertheaud
*Assistant Examiner* — Dnyanesh G Kasture
(74) *Attorney, Agent, or Firm* — Nixon & Vanderhye

(57) ABSTRACT

A metering mechanism including a metering element that is translatably mounted in a jacket, the jacket being mounted in an adjusting sleeve that can cooperate with the jacket by way of a screwing movement, the screwing/unscrewing movement causing a translatory movement of the metering element; at one end, the metering element is provided with a check valve, and at the other end, same accommodates a plunger, the reciprocating translatory movement of which creates suction at the end of the element provided with the valve, followed by expulsion into a volume surrounding the other end of the metering element via a passage formed in at least one first sealing device and in a second sealing device. A proportioning pump including a metering mecha- (Continued)

nism of the type as well as to a method for using a pump of the type in at least two metering ranges.

16 Claims, 12 Drawing Sheets

(56) References Cited

U.S. PATENT DOCUMENTS

| | | | |
|---|---|---|---|
| 6,129,526 | A | 10/2000 | Kelly |
| 7,975,597 | B2 | 7/2011 | Darbois et al. |
| 8,132,497 | B2 | 3/2012 | Darbois et al. |

FOREIGN PATENT DOCUMENTS

| | | |
|---|---|---|
| EP | 1 971 774 B1 | 5/2009 |
| EP | 1971776 B1 | 3/2010 |
| FR | 2 679 964 A1 | 2/1993 |
| FR | 2 681 646 A1 | 3/1993 |
| FR | 2 896 279 A1 | 7/2007 |
| FR | 2 896 281 A1 | 7/2007 |
| WO | 97/33090 A1 | 9/1997 |
| WO | 2007/080249 A1 | 7/2007 |
| WO | 2007/080250 A1 | 7/2007 |

\* cited by examiner

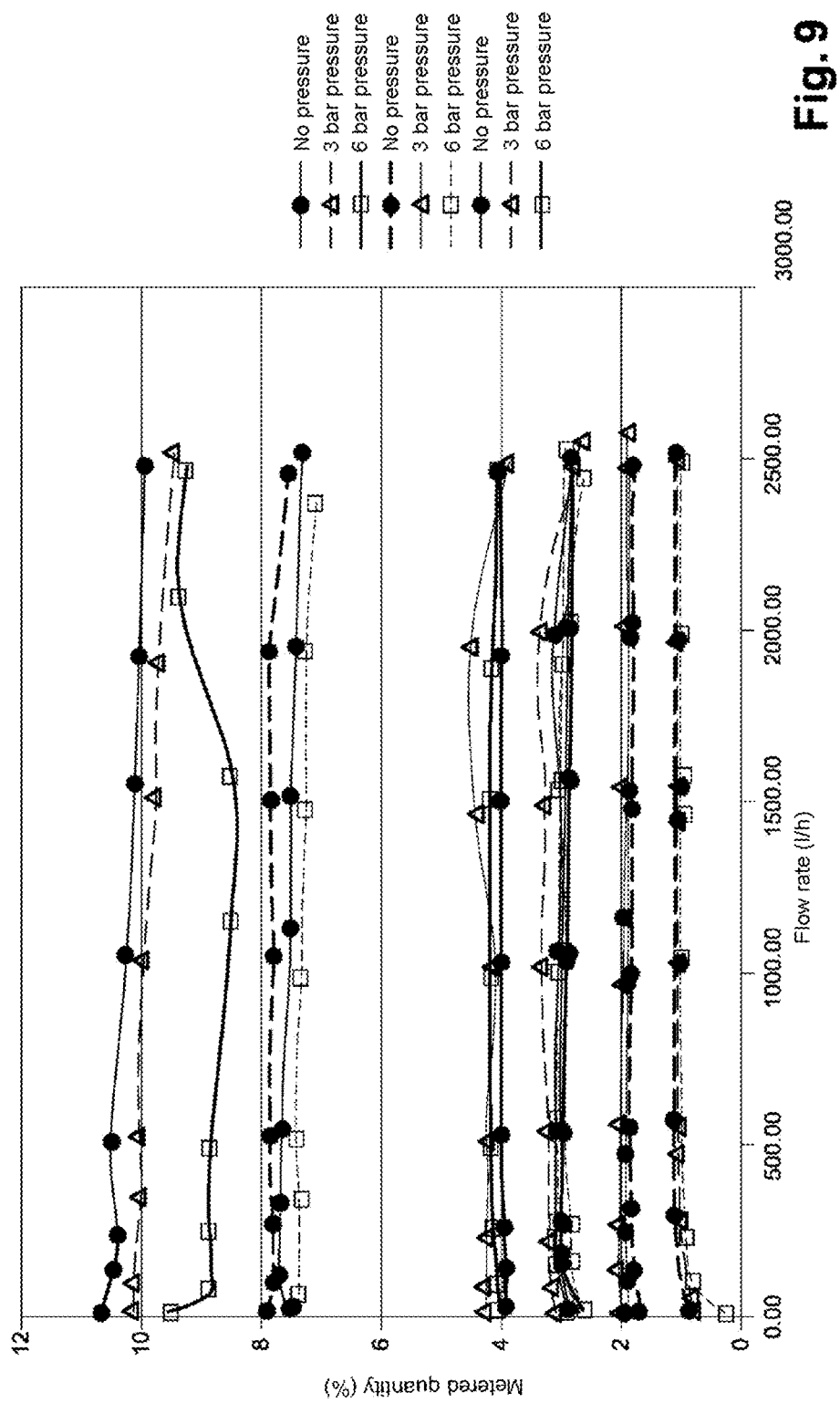

METERING MECHANISM FOR A PROPORTIONING PUMP, AND ASSOCIATED PUMP AND USAGE METHOD

The invention relates to a metering mechanism for a proportioning pump of the type including a hydraulic machine fed with a principal liquid and with a secondary liquid and a mechanism for metering the secondary liquid. The invention also consists in a proportioning pump and a method of using a pump of that kind.

BACKGROUND OF THE INVENTION

Proportioning pumps generally comprise a hydraulic machine. The hydraulic machine classically extends along a longitudinal axis and is provided with an inlet, an outlet, an access tube to a mixing chamber, and a metering mechanism. This metering mechanism is provided with a suction check valve and communicates at one of its ends with the mixing chamber inside the hydraulic machine and at the other of its ends with a container of product to be aspirated. The hydraulic machine is provided with a member adapted to effect an alternating movement, the feeding of the pump with liquid at the inlet triggering the alternating movement of the member, which member alternately brings about suction via the metering mechanism into the mixing chamber upon opening of the suction check valve when the member is moved away from the metering mechanism and then expulsion at the outlet of the pump upon closing of the suction check valve when the member is moved toward the metering mechanism.

FIG. 3 represents in particular a prior art metering mechanism capable of adjusting the volume aspirated by said mechanism. This metering mechanism comprises a metering body 10 mounted to move in translation in a jacket 3 itself mounted in an adjusting sleeve 4, said adjusting sleeve being adapted to cooperate by way of a screwing movement with said jacket. It is the screwing of the sleeve in and out along the jacket that drives movement in translation of the metering body. The body comprises at one of its ends a shut-off check valve 11 and receives at the other of its ends a plunger piston 9 the alternating movement of which in translation enables suction at the level of the end of the body provided with the check valve 11 and then expulsion into a volume surrounding the other end of the body. A nut 2 enables the metering mechanism to be fixed to an access tube to a mixing chamber of the hydraulic machine. A suction check valve seat 8 enables connection to a tube dipping into a container of product to be metered.

This type of metering mechanism must be capable of providing an accuracy of +/−10% over the whole of the metering range of a pump, that metering range having a ratio of 10 between the minimum and maximum metered amounts. This accuracy must also be provided over all the ranges of flow rate and of operating pressure of the pump.

However, this type of proportioning pump is not always able to deliver the required accuracy for the reasons to be explained below.

First of all, depending on the pressure and flow rate conditions, the cubic water capacity of the driving part varies. This can be caused primarily by the variable strokes of the hydraulic machine or by the relief valve opening and closing times, which differ depending on the flow rates.

Then, the intentional interruption of suction at the end of the up phase to relieve the suction forces or to aspirate variable volumes (i.e. volumes corresponding to the required metered amount), leads to suction in the up phase not being proportional throughout the stroke of the plunger piston.

For present day metering mechanisms, the dimensions of the metering body, primarily its diameter, are determined on the basis of the required highest metered amount value. This diameter multiplied by the maximum permissible stroke of the hydraulic machine then enables determination of the volume necessary to deliver the maximum metered amount. The lowest metered amount on the scale is therefore deduced from the maximum metered amount.

The accuracy in respect of the minimum metered amount is difficult to control because the suction length approaches the difference of the stroke of the plunger piston between low and high flow rates. For this reason, offering the possibility of a ratio of 10 between the minimum metered amount and the maximum metered amount imposes degraded accuracy in respect of the smallest metering amount value. This accuracy nevertheless remains acceptable for some applications. For example, for a metering mechanism adjustable from 1 to 10% and with a flow rate of 2.5 m3/h, the stroke of the hydraulic machine is 60 mm at high flow rates and 54 mm at low flow rates. Nominal suction strokes around 8 mm are defined for the minimum value on the scale. To assess a metering error over the whole of the flow rate range it is necessary to compare the 6 mm difference in the stroke of the plunger piston over the flow rate range and the 8 mm of suction available for low metered amounts. Consequently, an error greater than 10% is seen over the whole of the range of flow rate and pressure at the minimum position on the scale.

SUMMARY OF THE INVENTION

To obtain all metering values accurately over a 1 to 10% metering device, which it is not possible to achieve with only one metering body, it has been necessary to discover a means of adapting the diameter of the metering body to recover accuracy over all the metering values of the scale, even the lowest.

This is why the object of the invention is to alleviate some or all of the disadvantages described above by proposing a metering mechanism enabling all metering values to be obtained accurately, notably in the metering range from 1 to 10%. To achieve this, it is necessary to have recourse to two metering sub-assemblies of different diameter, the smaller one enabling coverage of the beginning of the range corresponding to low metered amounts and the larger one enabling coverage of the rest of the range corresponding to higher metered amounts. To achieve this, it is also necessary to be able to activate one or the other of the metering subassemblies according to the chosen metering range.

The invention more particularly consists in a metering mechanism comprising a metering body mounted to move in translation in a jacket itself mounted in an adjusting sleeve, said adjusting sleeve being adapted to cooperate by way of a screwing movement with said sleeve, screwing/unscrewing driving the metering body in translation, said body being provided at one of its ends with a shut-off check valve and accepting at the other of its ends a plunger piston the alternating movement in translation of which enables suction at the level of the end of the body provided with the check valve and then expulsion into a volume surrounding the other end of the body via a passage formed in at least one sealing device, the metering body including a central first cylinder and a peripheral second cylinder that are concentric and fastened to one another, the plunger piston being fastened to a first sealing device and a second sealing device respectively mounted to bear against the first and second cylinders, so that a reduced pressure zone is created inside the first and second cylinders, respectively, when the first and second sealing devices J1 are moved away from the end of the body provided with the check valve, the reduced pressure zone of the central first cylinder being adapted to be caused to communicate with the reduced pressure zone of the peripheral second cylinder and the reduced pressure zone of the peripheral second cylinder being adapted to be caused to communicate with the volume surrounding the end of the body opposite that provided with the check valve, the metering mechanism comprising a selector mounted on the central first cylinder and mobile relative thereto over a stroke delimited by a first position in which the communication between the reduced pressure zones of the first and second cylinders is cut off while the communication between the reduced pressure zone of the second cylinder and the volume surrounding the end of the body opposite that provided with the check valve is open and a second position in which the communication between the reduced pressure zones of the first and second cylinders is open while the communication between the reduced pressure zone of the second cylinder and the volume surrounding the end of the body opposite that provided with the valve is cut off.

Optional complementary or alternate features of the invention are defined hereinafter.

According to one particular embodiment, the communication enabling expulsion into the volume surrounding the end of the body opposite that provided with the check valve may be provided at least at the level of the second sealing device, said sealing device being a seal opened when the plunger piston moves toward the check valve.

According to a variant, the communication enabling expulsion into the volume surrounding the end of the body opposite that provided with the check valve may be provided at least at the level of a lip seal mounted on the plunger piston, said seal being open when the plunger piston moves toward the check valve.

According to another variant, the communication enabling expulsion into the volume surrounding the end of the body opposite that provided with the check valve may be completed at least at the level of a lip seal mounted on the plunger piston, said seal being open when the plunger piston moves toward the check valve.

According to one particular embodiment, the plunger piston may comprise a rod extended by a third cylinder between the central first cylinder and the peripheral second cylinder, the second sealing device being mounted on the exterior circumferential surface of the third cylinder.

According to another particular embodiment, the first sealing device may be mounted on the interior circumferential surface of the third cylinder.

According to a variant, the first sealing device may be mounted on an extension of the rod of the plunger piston so as to come to bear against the interior circumferential surface of the central first cylinder.

According to one particular embodiment, the communication between the reduced pressure zone of the peripheral second cylinder and the volume surrounding the end of the body opposite that provided with the check valve may be provided by at least one channel hollowed out within the thickness of the peripheral second cylinder and connecting said reduced pressure zone and said volume.

According to a variant, the communication between the reduced pressure zone of the peripheral second cylinder and the volume surrounding the end of the body opposite that provided with the check valve may be produced by the interstice delimited by two nested tubes constituting the peripheral second cylinder.

According to one particular embodiment, the communication between the reduced pressure zones of the first and second cylinders may be produced by means of at least one opening within the thickness of the central first cylinder.

According to one particular embodiment, the first and second positions delimiting the stroke of the selector may respectively be defined by abutment surfaces formed on means for immobilizing the adjusting sleeve and an assembly nut.

According to one particular embodiment, the selector may be mounted to move in translation along the central first cylinder and may be a nut cooperating with a screwing/unscrewing movement with a threaded zone produced on the exterior circumferential surface of the central first cylinder, so that the first position in which the communication between the reduced pressure zones of the first and second cylinders is cut off while the communication between the reduced pressure zone of the second cylinder and the volume surrounding the end of the body opposite that provided with the check valve is open corresponds to the screwed in position of the nut, and so that the second position in which the communication between the reduced pressure zones of the first and second cylinders is open while the communication between the reduced pressure zone of the second cylinder and the volume surrounding the end of the body opposite that provided with the check valve is cut off corresponds to the screwed out position of the nut.

Alternatively, the selector may be a ring mounted on the central first cylinder with a sliding connection.

As a further alternative, the selector may be a device comprising a relief valve and a seal that are controlled manually by the rotation of a ring over a stroke preferably extending over one half-turn, said relief valve establishing communication at one of the ends of the stroke between the reduced pressure zones of the first and second cylinders while the seal shuts off the communication between the reduced pressure zone of the second cylinder and the volume surrounding the end of the body opposite that provided with the check valve, and vice versa at the other end of the stroke of said ring.

As a further variant, the selector may be a device comprising a hydraulic slide mobile in translation, a slot and a seal, the slide establishing communication at one of the ends of its stroke between the reduced pressure zones of the first and second cylinders via the slot while the seal closes the communication between the reduced pressure zone of the second cylinder and the volume surrounding the end of the body opposite that provided with the check valve, and vice versa at the other end of the stroke of said slide. According to an improvement, the selector includes on its exterior surface first and second markings respectively corresponding to the first and second positions delimiting the stroke of the selector.

When the selector includes first and second markings on its exterior surface, the first and/or second markings may be associated with detection means in such a manner as to determine the position of the selector.

The invention also consists in a proportioning pump comprising a hydraulic machine provided with an inlet and an outlet, a metering mechanism communicating at one of its ends with an access tube to an interior mixing chamber of the pump and at the other of its ends with a reservoir of product to be metered, the hydraulic machine extending along a longitudinal axis and enclosing a member adapted to effect an alternating movement, the feeding of the pump with liquid at the inlet triggering the alternating movement of the member, which movement alternately brings about suction via the metering mechanism into the mixing chamber with opening of a suction check valve when the member moves away from the metering mechanism and then expulsion at the outlet of the pump with closure of the suction check valve when the member moves toward the metering mechanism, characterized in that the metering mechanism conforms to one embodiment.

The invention also consists in a method of using a proportioning pump according to the invention, the selector including on its exterior surface first and second markings respectively corresponding to the first and second positions delimiting the stroke of the selector, themselves respectively corresponding to metering values between X % and Y % inclusive and to metering values between Y % and Z % inclusive, Y lying between X and Z, the jacket of the metering mechanism including a graduation corresponding to metering values, characterized in that the method comprises:

a step of selection of the metering range X %-Y % or Y %-Z % by positioning the selector in one or the other of the first and second positions delimiting the stroke of the selector, and then a step of selection of the metering value by adjusting the sleeve to the chosen metering value.

BRIEF DESCRIPTION OF THE DRAWINGS

Other advantages and particular features of the invention will become apparent on reading the detailed description of nonlimiting uses and embodiments and from the following appended drawings:

FIG. 7b is a detailed view of FIG. 7a.

FIG. 8b is a detailed view of FIG. 8a.

FIG. 9 represents a curve combining the results obtained.

DETAILED DESCRIPTION OF THE PREFERRED EMBODIMENTS

The embodiments described hereinafter being in no way limiting, there may notably be considered variants of the invention comprising only a selection of the features described, separately from the other features described (even if that selection is isolated within a sentence comprising those other features), provided that said selection of features is sufficient to confer a technical advantage or to differentiate the invention from the prior art. This selection comprises at least one feature, preferably a functional feature without structural details, or with only some of the structural details provided that said part alone is sufficient to confer a technical advantage or to differentiate the invention from the prior art.

For conciseness and clarity, elements bear the same references in the various figures.

Figure 1:
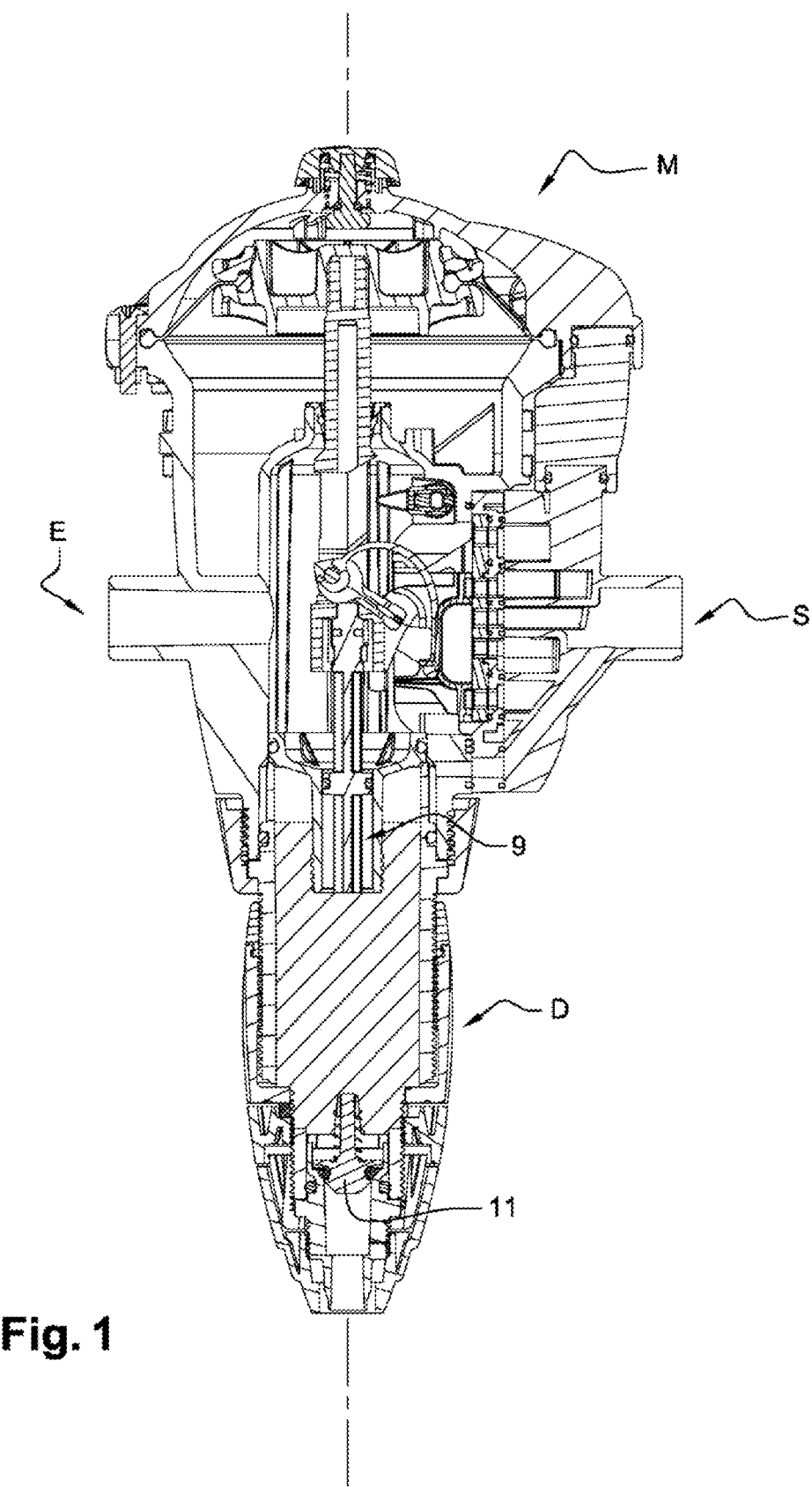
FIG. 1 is a schematic representation of a proportioning pump utilizing a first type of hydraulic machine.
Figure 2:
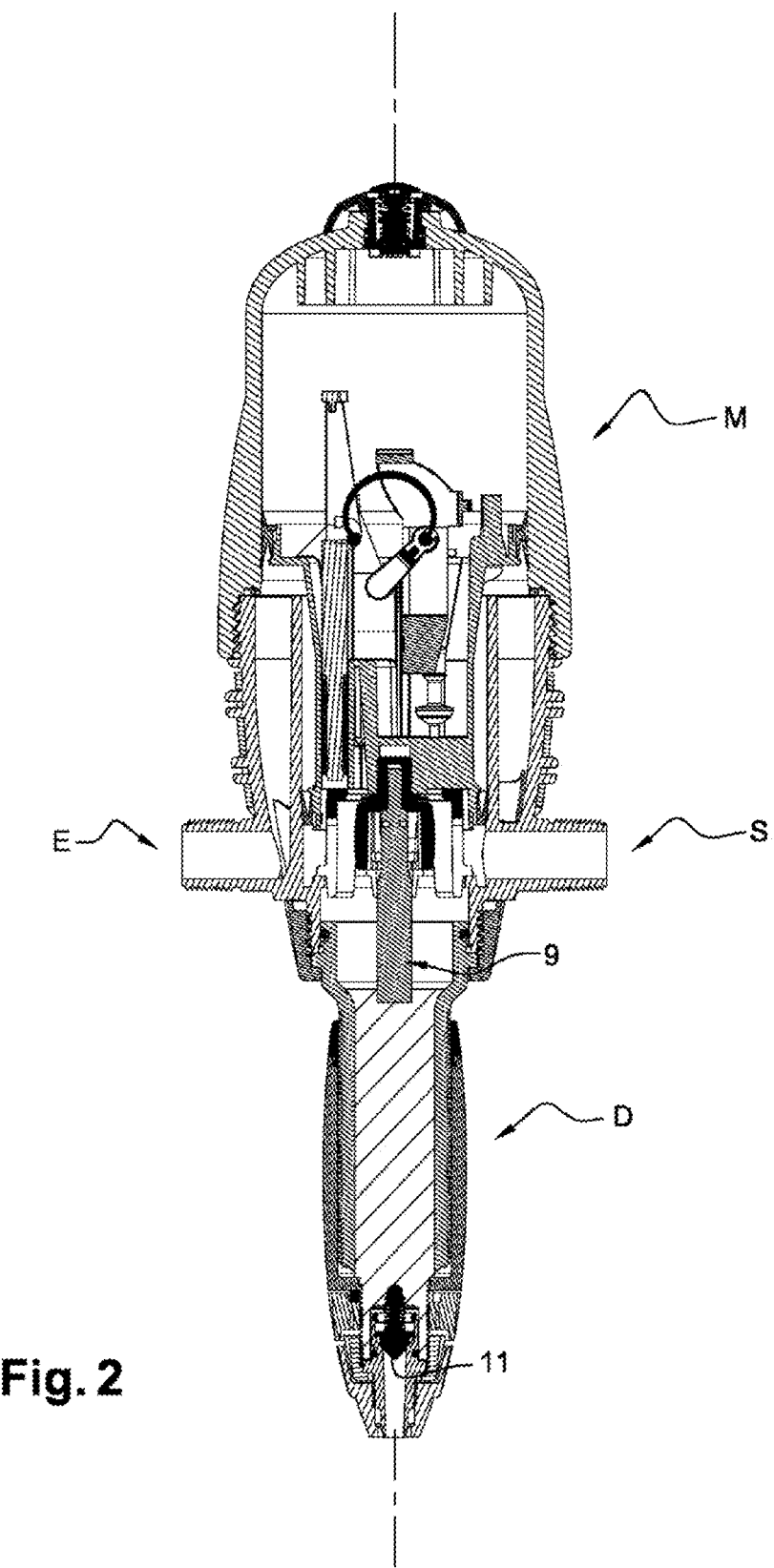
FIG. 2 is a schematic representation of a proportioning pump utilizing a second type of hydraulic machine.
Figure 3:
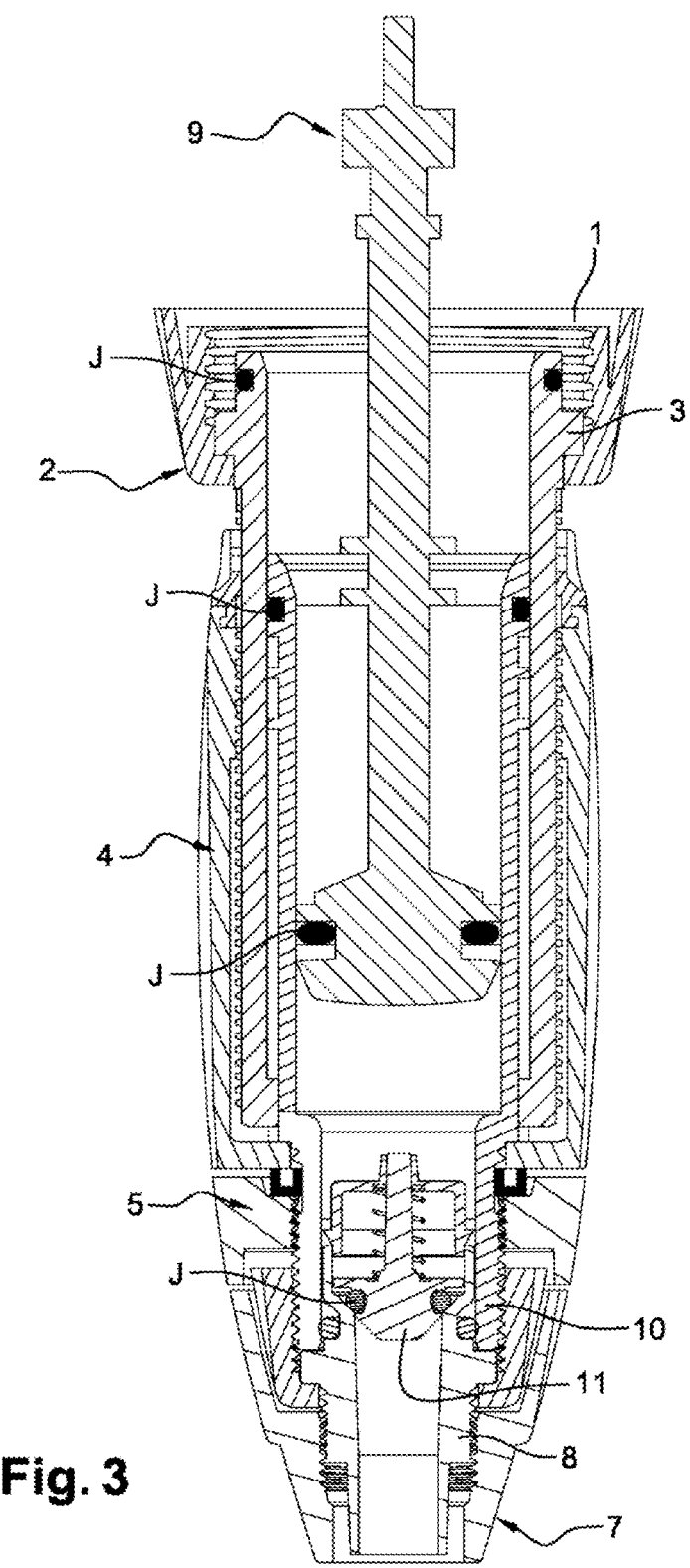
FIG. 3 is a detailed view of a prior art metering mechanism.

As represented in FIGS. 1 and 2, one subject matter of the invention is a proportioning pump comprising a hydraulic machine M provided with an inlet E and an outlet S and a particular integrated metering mechanism D, communicating at one of its ends with an access tube 1 to a mixing chamber inside the pump and at the other of its ends with a reservoir of product to be metered.

The hydraulic machine extends along a longitudinal axis Z and encloses a member adapted to effect an alternating movement, the feeding of the pump with liquid at the inlet triggering the alternating movement of the member, which movement brings about alternately suction via the metering mechanism D into the mixing chamber with a suction check valve open when the member is moved away from the metering mechanism and then expulsion at the outlet of the pump with the suction check valve 11 closed when the member moves toward the metering mechanism.

Each of FIGS. 1 and 2 represents an embodiment of a proportioning pump. It includes a hydraulic machine M extending along a longitudinal axis and provided with an inlet E, an outlet S, an access tube to a mixing chamber, and a metering mechanism D. That metering mechanism is provided with a suction check valve 11 and communicates at one of its ends with a mixing chamber inside the pump and at the other of its ends with a container of product to be aspirated (not represented in the figure).

The hydraulic machine is provided with a member adapted to effect an alternating movement, the feeding of the pump with liquid at the inlet triggering the alternating movement of the member, which member alternately brings about suction via the metering mechanism to the mixing chamber with the suction check valve open when the member is moved away from the metering mechanism and then expulsion at the outlet of the pump with the suction check valve closed when the member moves toward the metering mechanism.

The hydraulic machine can be of the type described in the document EP1971776 A1 and represented in FIG. 1.

That hydraulic machine comprises an envelope including a body, a cover and a separation means adapted to effect an alternating movement in the envelope between the body and the cover, that separation means defining two chambers. The hydraulic machine also comprise hydraulic switching means for the feeding with liquid and the evacuation of the aforementioned chambers.

Those switching means comprise a distribution member able to adopt two stable positions and controlled by the movements of the separation means. The body of the envelope moreover encloses a compartment connected to a pressurized liquid inlet and in which the switching means are accommodated, together with triggering means comprising a plunger connected to the separation means, adapted to bring out, at the end of stroke, a sudden change in the position of the switching means by an elastic means, to reverse the stroke.

The distribution member comprises a distribution slide pressed against a flat plate fixed relative to the body of the envelope, the distribution slide being able to seal in a sliding manner without a seal against the plate, which includes respective orifices connected to the chambers of the envelope and to a liquid outlet orifice. The slide is then adapted, according to its position, to shut off some of the orifices or to put them into communication with the fluid inlet or with the exit.

The hydraulic machine can also be of the type described in the document EP1971774 A1 and represented in FIG. 2.

In this case, the hydraulic machine comprises an envelope, a piston adapted to slide with an alternating movement in the envelope, the piston separating the envelope into two chambers, and hydraulic switching means for feeding with liquid and evacuation of the chambers separated by the piston.

Those switching means are controlled by the movements of the piston and include at least one link acting on a distribution member able to adopt two stable positions. There are further provided trigger means comprising a plunger adapted, at the end of stroke of the piston, to bring about a sudden change in the position of the switching means by an elastic means to reverse the stroke. The elastic means is fastened at each of its ends to an articulation member received in a respective housing provided on the link and on another moving part of the hydraulic machine, each housing being open in a direction substantially opposite to the direction of the force exerted by the elastic means in the housing, so that each articulation member can be extracted from its open housing against said force.

Figure 4A:
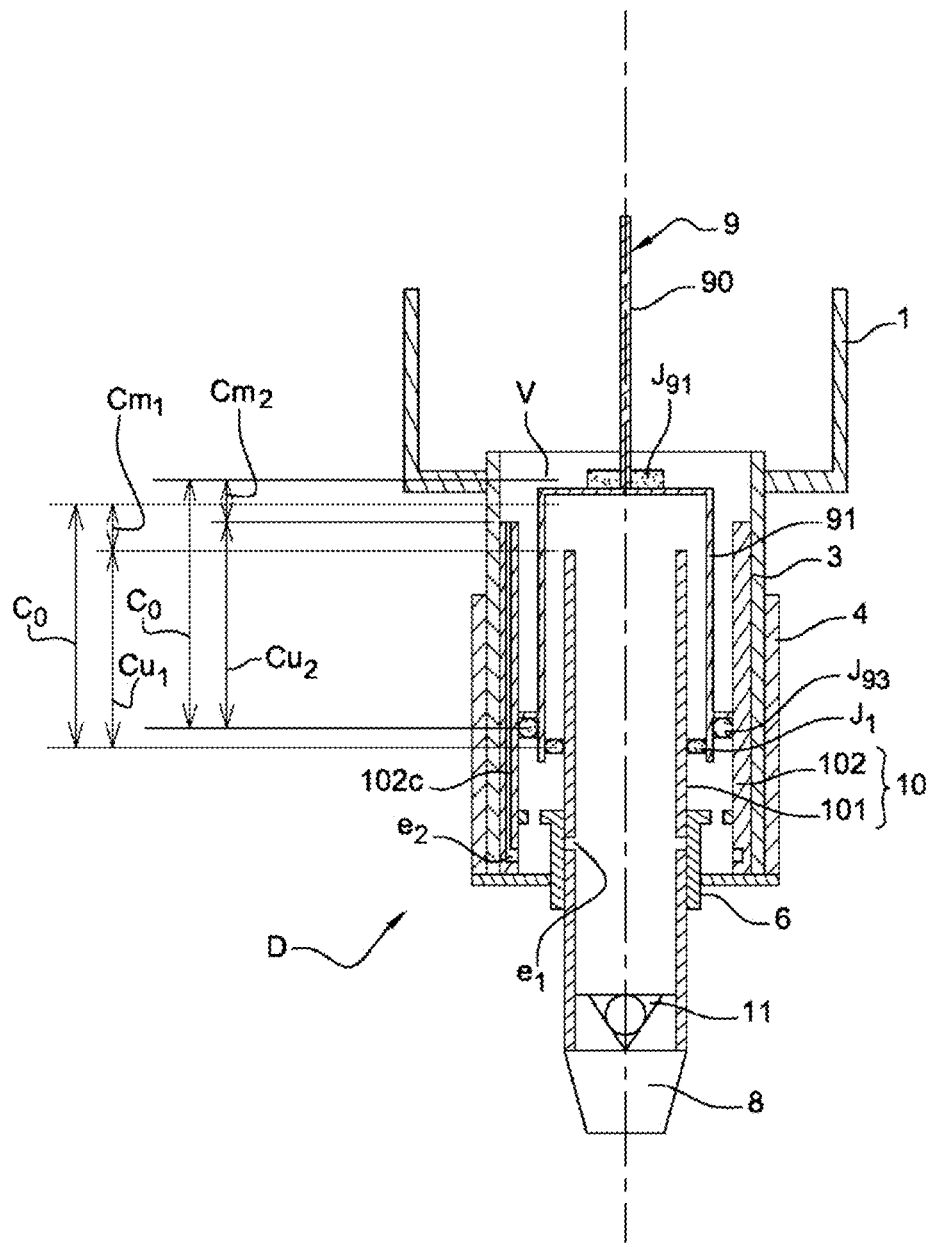
FIG. 4a is a theoretical schematic of the invention.

The invention also consists in a metering mechanism as represented in FIG. 4a illustrating its operating principle. The metering mechanism comprises a metering body 10 mounted to move in translation in a jacket 3 itself mounted in an adjusting sleeve 4. The adjusting sleeve is adapted to cooperate by way of a screwing movement with the jacket, so that screwing it in and screwing it out drive movement in translation of the metering body. By a screwing movement is meant a movement in a Euclidian affine space that is the commutative component of a rotation and of a movement in translation along a vector directing the rotation axis (in this instance the longitudinal axis). Accordingly, the screwing movement type cooperation of two parts must be understood in the broad sense and must not be limited only to the cooperation of screwthreads between the two parts.

The metering body is provided at one of its ends with a check valve 11 extended by a nose 8 intended to aspirate the product to be metered and receiving at the other of its ends a plunger piston 9 the alternating movement in translation of which enables suction at the level of the end of the metering body provided with the check valve 11 and then expulsion into a volume V surrounding the other end of the body via a passage that may be formed in at least one sealing device J91, J1, J93.

The metering body includes a central first cylinder 101 and a peripheral second cylinder 102 that are concentric and fastened to one another.

The plunger piston is fastened to a first sealing device J1 and a second sealing device J93 respectively mounted to bear against the first cylinder and the second cylinder. In this way a zone of reduced pressure is created inside the first and second cylinders when the first and second sealing devices J1, J93, respectively, are moved away from the end of the body provided with the check valve.

The reduced pressure zone of the central first cylinder is able to communicate with the reduced pressure zone of the peripheral second cylinder by means of a communication e1. This communication e1 can take the form of one or more openings formed in the wall of the central first cylinder.

Likewise, the reduced pressure zone of the peripheral second cylinder is able to communicate with the volume V surrounding the end of the body opposite that provided with the check valve by means of a communication e2. This communication e2 can take various forms that constitute the subject matter of the embodiments described later in the description.

The metering mechanism comprises a selector 6 mobile in translation along the central first cylinder over a stroke delimited by a first position and a second position.

In the first position, the communication e1 between the reduced pressure zones of the first and second cylinders is closed while the communication e2 between the reduced pressure zone of the second cylinder and the volume surrounding the end of the body opposite that provided with the check valve is open.

In the second position, the communication e1 between the reduced pressure zones of the first and second cylinders is open while the communication e2 between the reduced pressure zone of the second cylinder and the volume surrounding the end of the body opposite that provided with the check valve is closed.

The passage enabling expulsion into the volume surrounding the end of the body opposite that provided with the check valve is provided at least at the level of a sealing device.

Concerning now the kinematics of the metering mechanism, and as represented schematically in FIG. 4a, the plunger piston allows a stroke of total length equal to C0. Of course, the first sealing device J1 and the second sealing device J93 also allow a stroke of total length C0 because they are fastened to the plunger piston 9. However, in such a manner as to reduce the pumping force and the rubbing of the seals on the walls of the cylinders, these sealing devices J1 and J93 allow a stroke Cu1, Cu2, respectively, in contact with the first cylinder 101 and the second cylinder 102, and then a stroke Cm1, Cm2, respectively, without contact, that corresponds to the "rolling off" of the seals J1 and J93.

Accordingly, $Cu1+Cm1=Cu2+Cm2=C0$.

Figure 4B:
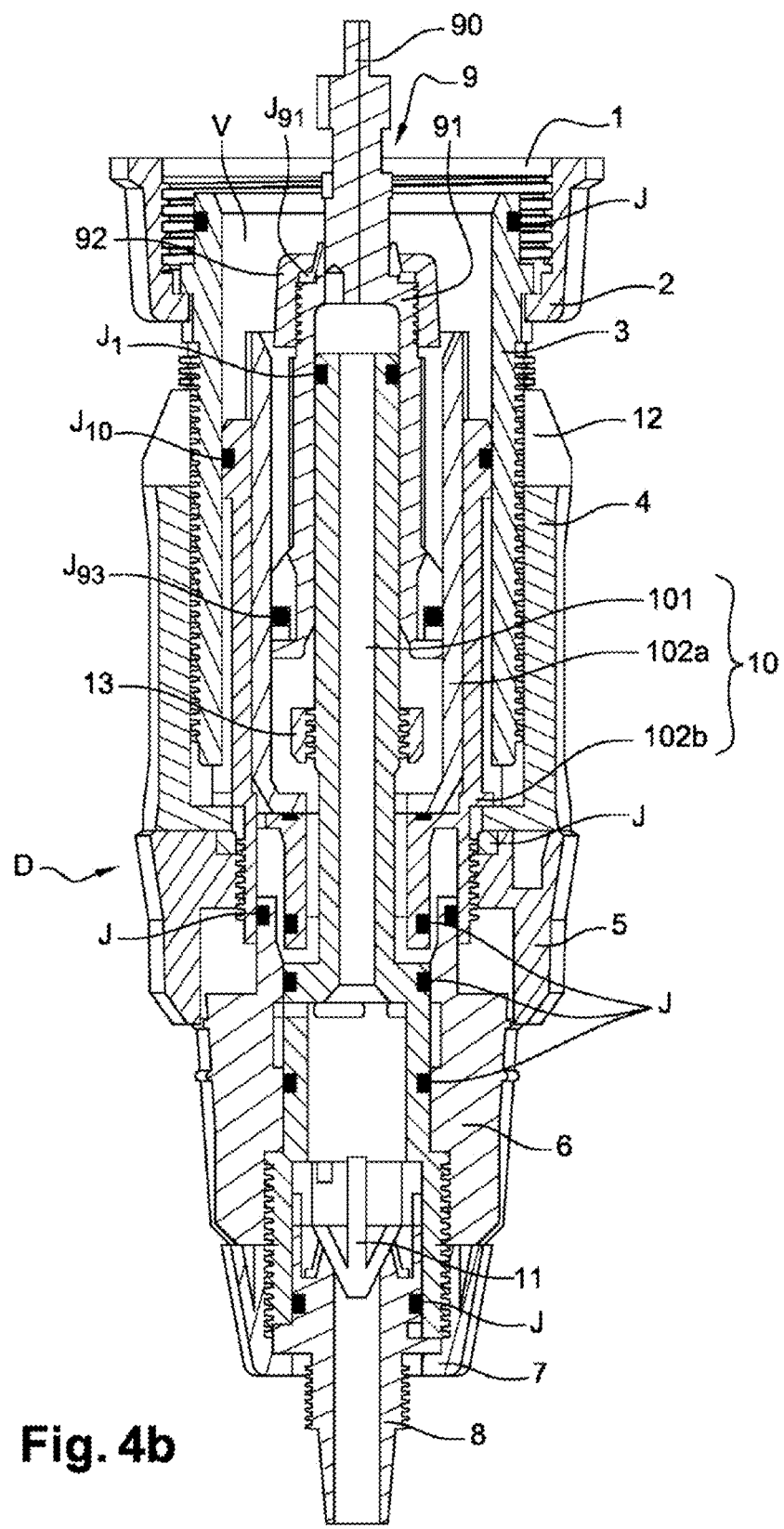
FIG. 4b is a view in longitudinal section of one embodiment of a metering mechanism according the invention.

According to an embodiment represented in FIG. 4b, the communication enabling the expulsion into the volume V surrounding the end of the body opposite that provided with the check valve is produced at the level of a lip seal J91 mounted on the plunger piston 9, said seal being open when the plunger piston is moved toward the check valve. This communication is also provided via the second sealing device J93, the latter being a seal that is opened when the plunger piston is moved toward the check valve.

By a seal that is opened is meant a seal that is opened by an increase in pressure in the volume that the seal shuts off. This type of seal serves as a check valve. It can be made from an elastomer as a lip seal, an umbrella check valve, a duckbeak check valve, or in more standard implementations of check valves such as ball valves, needle valves, with or without pre-loading springs.

In accordance with other embodiment configurations not represented, the expulsion can also be effected in different ways.

Accordingly, the expulsion into the volume V could be effected via lip seal J91 mounted on the plunger piston 9 and via the first sealing device J1 and then the second sealing device J93, each of the latter being seals that are open when the plunger piston is moved toward the check valve. On the other hand, the first sealing device J1 would remain closed when the plunger piston is moved toward the check valve.

Alternatively, the expulsion into the volume V could be effected via the lip seal J91 mounted on the plunger piston 9 and via the first sealing device J1, the latter also being a seal that is opened when the plunger piston is moved toward the check valve. On the other hand, the second sealing device J93 would remain closed when the plunger piston is moved toward the check valve.

In accordance with a further configuration, it is not necessary to have recourse to a lip seal J91 mounted on the plunger piston 9. In this case, the expulsion into the volume V is effected via the first sealing device J1 and then the second sealing device J93, each of the latter being a seal that is opened when the plunger piston is moved toward the check valve.

As represented in FIG. 4b, the plunger piston comprises a rod 90 extended by a third cylinder 91 between the central first cylinder 101 and the peripheral second cylinder 102. In this configuration, the first sealing device J1 is mounted on the interior circumferential surface of the third cylinder 91 and the second sealing device J93 is mounted on the exterior circumferential surface of the third cylinder 91.

Of course, other embodiments can be envisaged. Accordingly, the first sealing device J1 can be mounted on an extension of the rod 90 of the plunger piston in such a manner as to come to bear against the interior circumferential surface of the central first cylinder 101.

Figure 5:
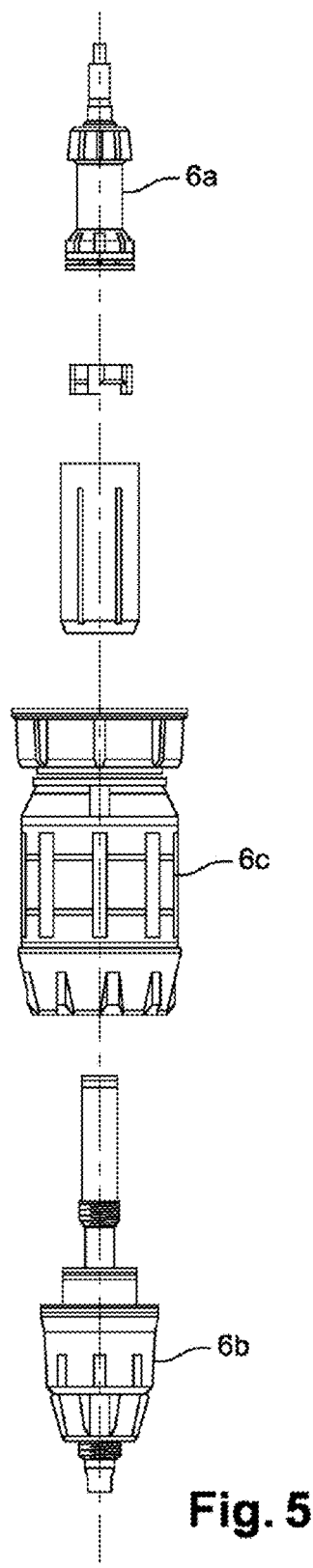
FIG. 5 is an exploded view of a metering mechanism according to FIG. 4b.
Figure 6A:
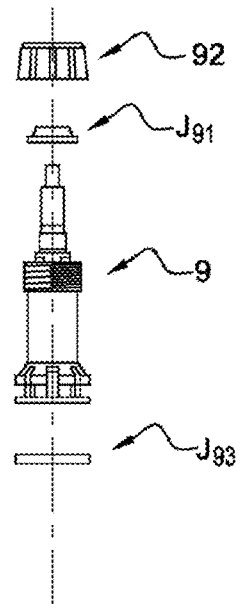
FIG. 6a is an exploded view of a detail of a metering mechanism according to FIG. 4b.
Figures 6B, 6C:
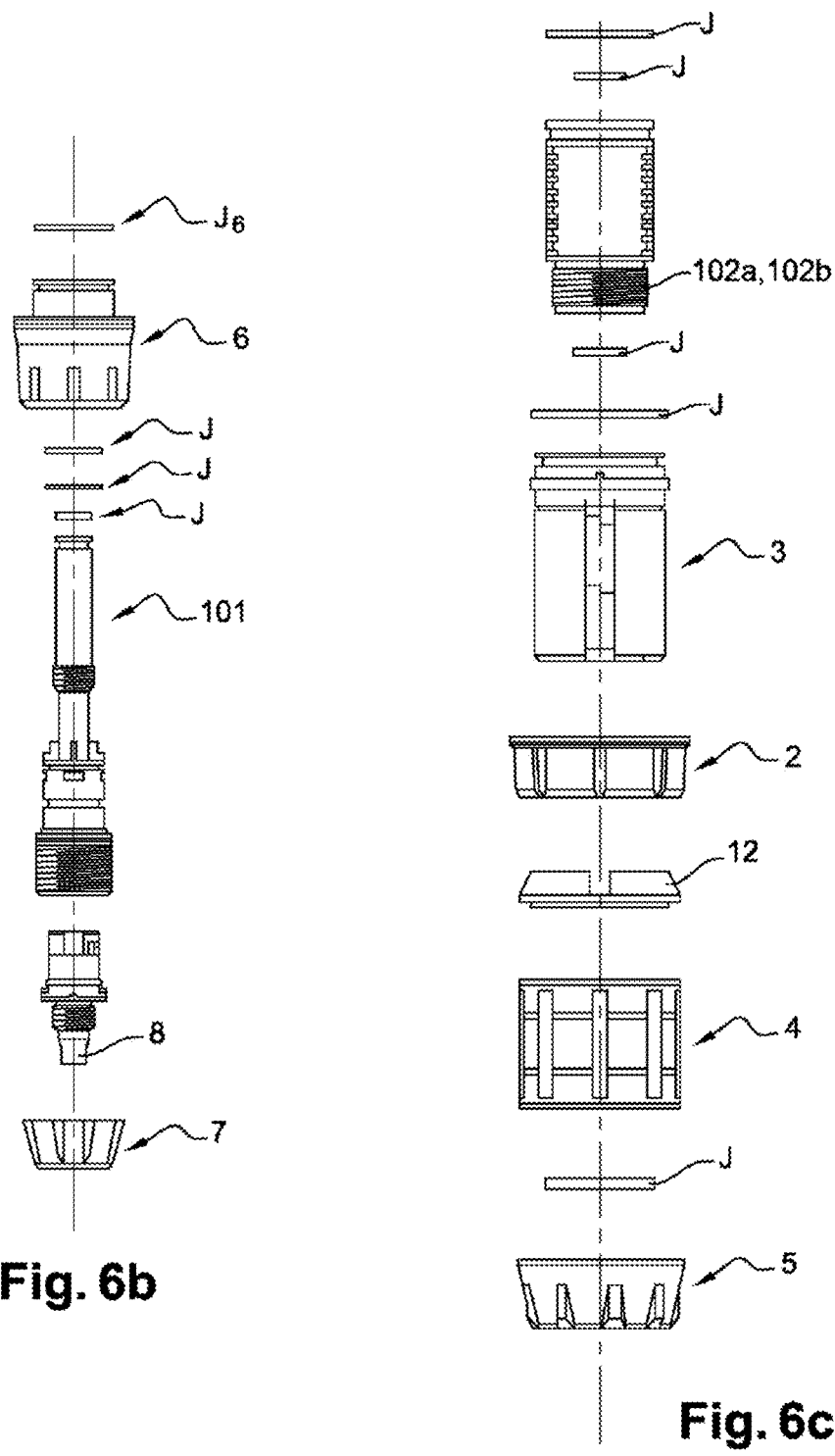
FIG. 6b is an exploded view of a detail of a metering mechanism according to FIG. 4b.
FIG. 6c is an exploded view of a detail of a metering mechanism according to FIG. 4b.

FIG. 5 defines a metering mechanism in accordance with one aspect of the invention that rests on three subassemblies shown in FIGS. 6a, 6b, 6c, respectively.

The subassembly 6a combines the plunger piston 9 and the seals J91 and J93 for use of the metering body in the range of large metered amounts.

The subassembly 6b combines the selector 6 mounted in a manner sealed by the seals J on the nose 8 and the bottom of the central first cylinder 101 for use of the metering body in the range of small metered amounts.

The subassembly 6c comprises the peripheral second cylinder 102 mounted in the jacket 3, itself mounted in the adjusting sleeve 4.

As represented in FIGS. 7a, 7b, 8a and 8b, the communication e1 between the reduced pressure zones of the first and second cylinders is produced with at least one opening within the thickness of the central first cylinder. The communication e2 between the reduced pressure zone of the peripheral second cylinder and the volume surrounding the end of the body opposite that provided with the check valve is provided by an interstice delimited by two nested tubes 102a, 102b constituting the peripheral second cylinder 102. A seal J10 forms the seal between the tube 102b and the jacket 3.

In accordance with another embodiment shown in part in FIG. 4a, the communication e2 between the reduced pressure zone of the peripheral second cylinder and the volume surrounding the end of the body opposite that provided with the check valve could be provided by at least one channel 102c hollowed out within the thickness of the peripheral second cylinder and connecting said reduced pressure zone and said volume. In this case, the peripheral second cylinder 102 may consist of a single part given that it is no longer constituted by two nested tubes 102a, 102b because no interstice is necessary.

As represented in FIGS. 7a, 7b, 8a and 8b, the first and second positions delimiting the stroke of the selector are respectively defined by abutment surfaces formed on means 5 for immobilizing the adjusting sleeve 4 and a nut 7 assembling the nose 8 with the metering body 101.

In the embodiment shown in FIGS. 4b, 5, 6a, 6b, 6c, 7a, 7b, 8a and 8b, the selector 6 is a nut cooperating by way of a screwing/unscrewing movement with a threaded zone provided on the exterior circumferential surface of the central first cylinder.

The position in which the nut 6 is screwed against the means 5 for immobilizing the adjusting sleeve 4 corresponds to a configuration in which the communication e1 between the reduced pressure zones of the first and second cylinders is closed while the communication e2 between the reduced pressure zone of the second cylinder and the volume surrounding the end of the body opposite that provided with the check valve is open.

The position in which the nut 6 is unscrewed against the nut 7 assembling the nose 8 with the metering body 101 correspond to a configuration in which the communication e1 between the reduced pressure zones of the first and second cylinders is open while the communication e2 between the reduced pressure zone of the second cylinder and the volume surrounding the end of the body opposite that provided with the check valve is closed.

According to a variant not represented, the selector 6 could equally well be a ring mounted on the central first cylinder 101 with a sliding connection. The person skilled in the art will know how to provide and to define means for stopping the selector at each of the positions delimiting its stroke.

According to a further variant not represented, the movement of the selector 6 could equally well be effected by means of a cam.

Figure 10A:
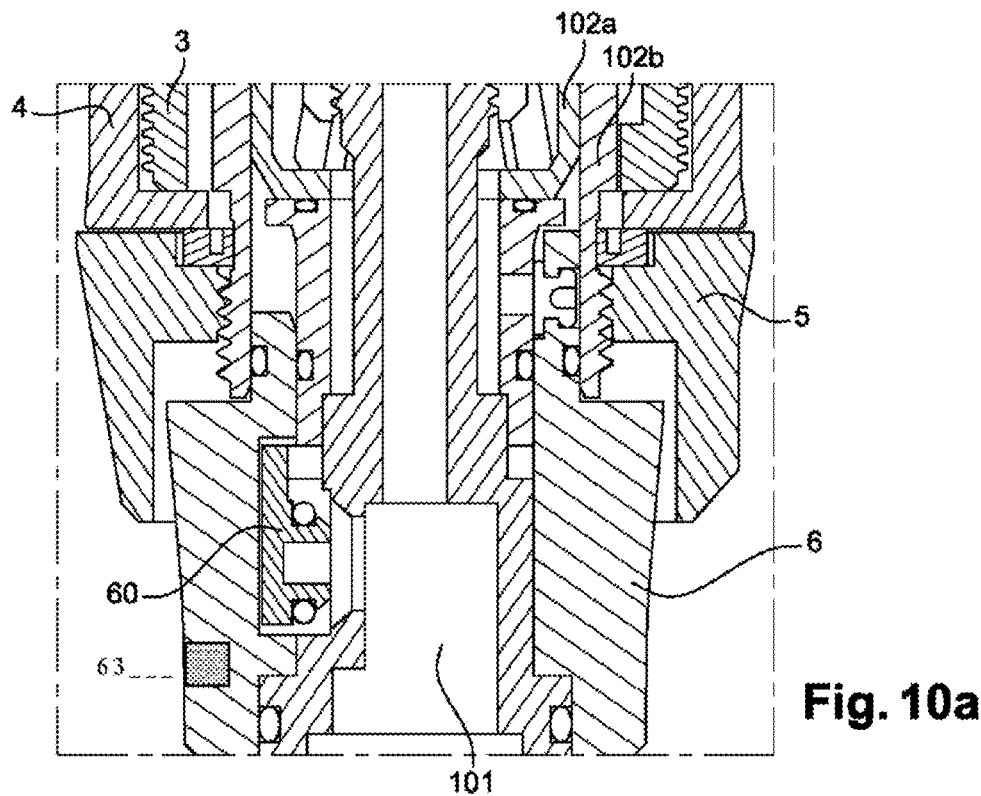
FIGS. 10a, 10b are views of a metering mechanism in accordance with one embodiment.
Figure 10B:
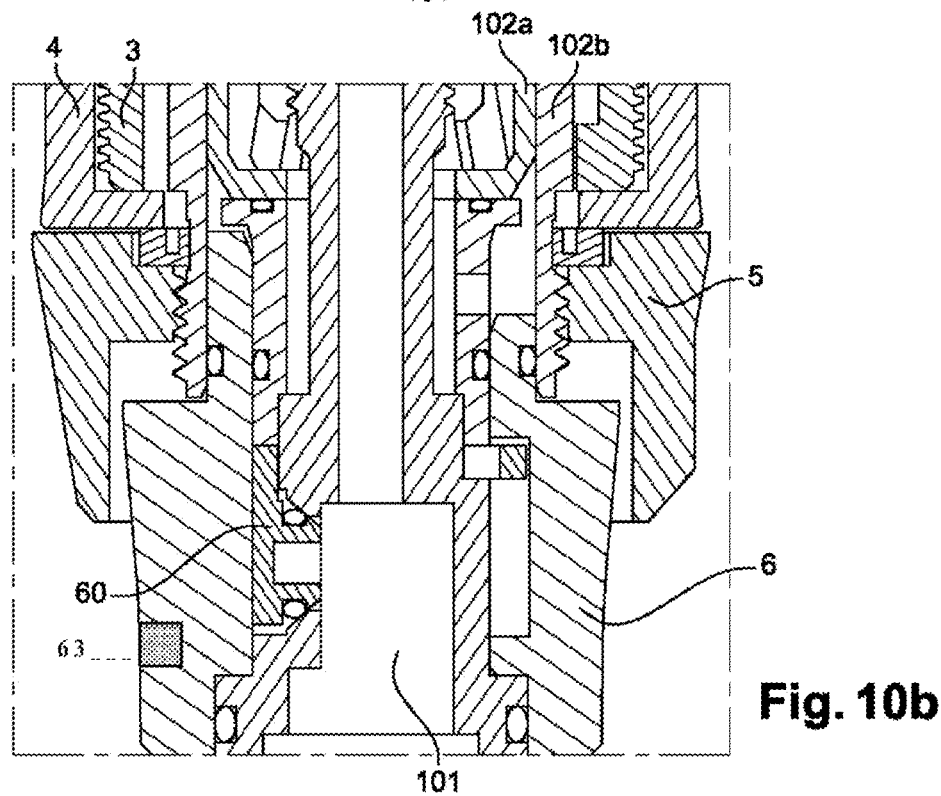

According to another variant and as represented in FIGS. 10a and 10b, the selector 6 could be a device comprising a relief valve (60) and a seal that are controlled manually by the rotation of a ring over a stroke preferably extending over one half-turn, said relief valve establishing communication at one of the ends of the stroke between the reduced pressure zones of the first and second cylinders while the seal closes the communication between the reduced pressure zone of the second cylinder and the volume surrounding the end of the body opposite that provided with the check valve, and vice versa at the other end of the stroke of said ring.

In FIG. 10a, the communication e1 between the reduced pressure zones of the first and second cylinders is open because the relief valve is open. The communication e2 between the reduced pressure zone of the second cylinder and the volume surrounding the end of the body opposite that provided with the check valve is on the other hand closed. Accordingly the flow of water coming from the hydraulic machine is closed by the seal that blocks the passage.

In FIG. 10b, it is the opposite. The communication between the two reduced pressure zones is closed (relief valve closed). The circulation of water coming from the hydraulic machine to the suction zone is open, the seal no longer blocking the passage.

According to another variant, the selector 6 could be a device comprising a hydraulic slide 61 mobile in translation, a slot 62 and a seal, the slide establishing communication at one of the ends of its stroke between the reduced pressure zones of the first and second cylinders via the slot while the seal closes the communication between the reduced pressure zone of the second cylinder and the volume surrounding the end of the body opposite that provided with the check valve, and vice versa at the other end of the stroke of said slide.

Figure 11A:
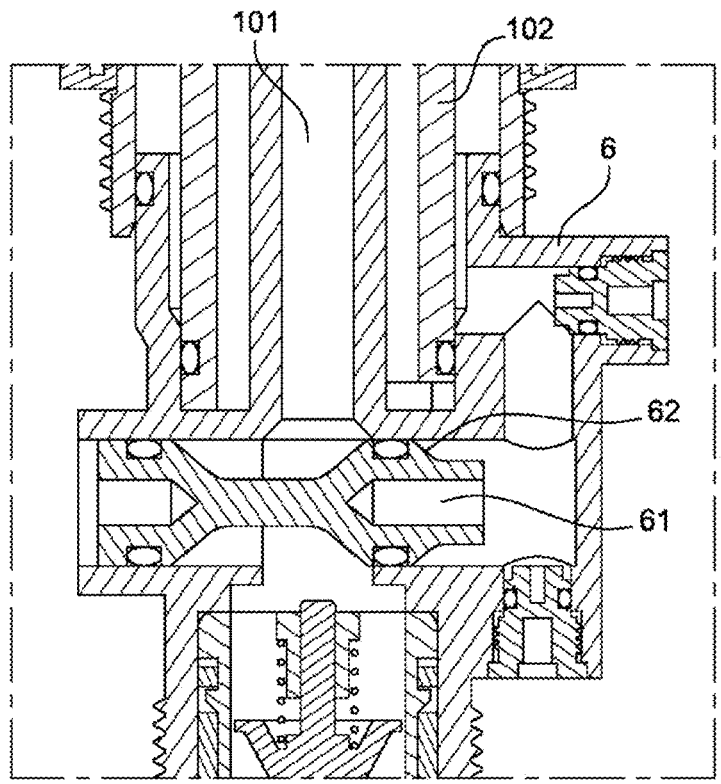
FIGS. 11a, 11b are views in longitudinal section of a detail of a metering mechanism in accordance with another embodiment.
Figure 11B:
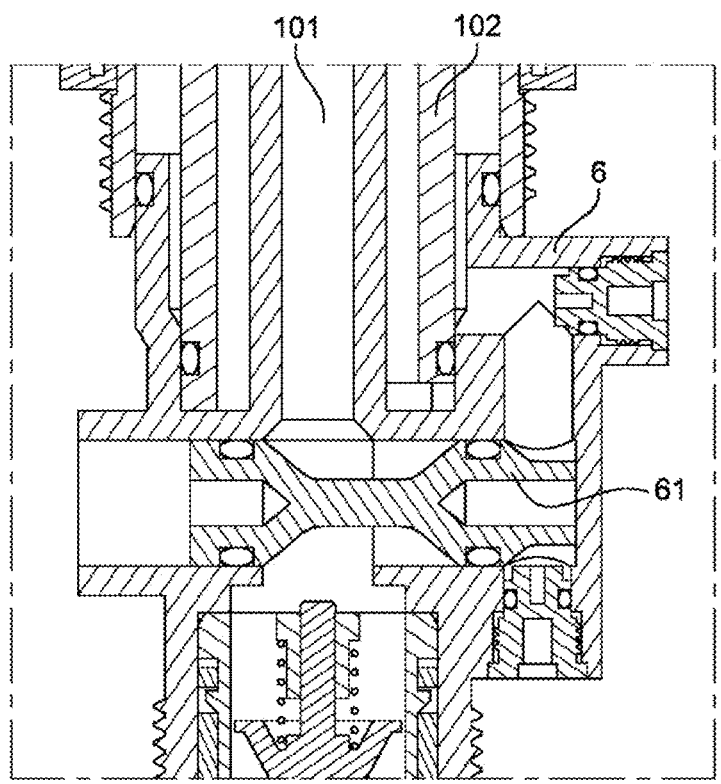

In FIG. 11b, the communication e1 between the reduced pressure zones of the first and second cylinders is open. The communication e2 between the reduced pressure zone of the second cylinder and the volume surrounding the end of the body opposite that provided with the check valve is on the other hand closed. Accordingly, the slide blocks the slot and water can no longer circulate from the hydraulic machine and pass through the slot. In this way, the suction induced in the reduced pressure zones of the first and second cylinders draws in the product to be metered.

In FIG. 11a, it is the opposite. The communication between the two reduced pressure zones is closed (relief valve closed). The circulation of the water coming from the hydraulic machine to the suction zone is open. The slide opens the slot and water can circulate from the hydraulic machine and pass through the slot. So as to facilitate the use of the metering mechanism, the selector includes on its exterior surface first and second markings easily deciphered by the user and respectively corresponding to the first and second positions delimiting the stroke of the selector.

The method of using a proportioning pump according to the invention will now be described in detail.

Firstly, it is necessary to select the metering range X %-Y % or Y %-Z % by positioning the selector in one or the other of the first and second positions delimiting the stroke of the selector.

The selector advantageously includes on its exterior surface first and second markings respectively corresponding to the first and second positions delimiting the stroke of the selector, respectively corresponding to metering values between X % and Y % inclusive and to metering values between Y % and Z % inclusive, Y being between X and Z.

Moreover, the sleeve 3 of the metering mechanism advantageously also includes a graduation corresponding to metering values.

Then there follows a step of selection of the metering value by adjusting the sleeve 4 to the selected metered amount.

Figure 7B:
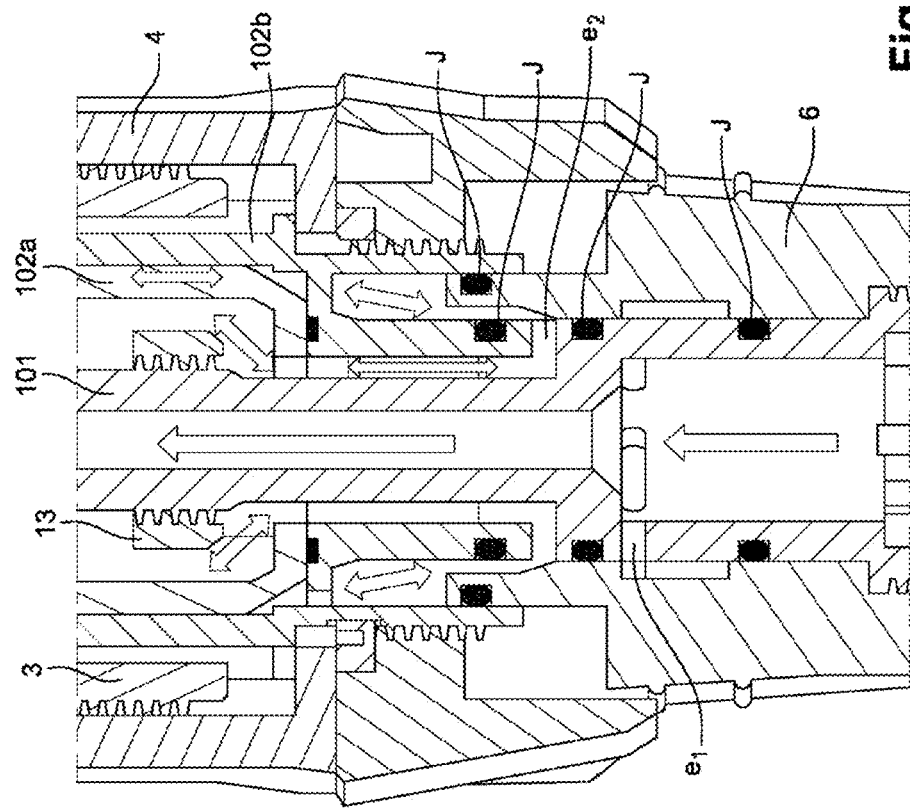
Figure 7A:
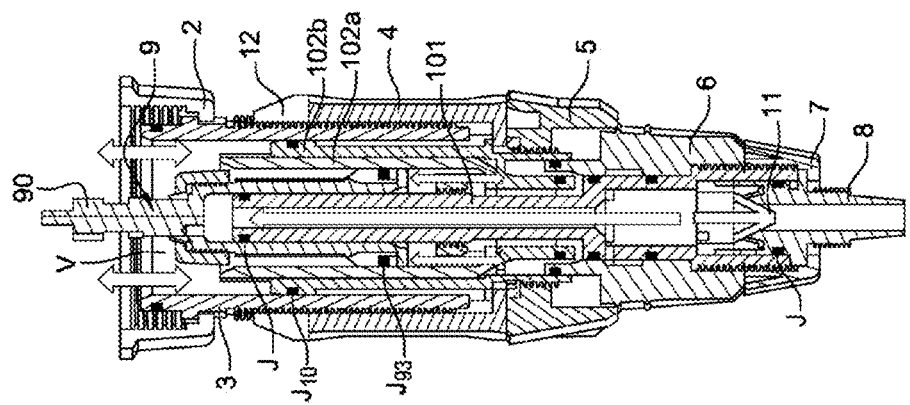
FIG. 7a is a view in longitudinal section of a metering mechanism according to FIG. 4b in a mode of operation dedicated to small metered amounts.

When the selector is positioned on the small metered amounts range X %-Y %, and referring to FIGS. 7a and 7b, the selector 6 is in the position in which the communication e1 between the reduced pressure zones of the first and second cylinders is closed while the communication e2 between the reduced pressure zone of the second cylinder and the volume surrounding the end of the body opposite that provided with the check valve is open.

The reduced pressure zone of the central first cylinder does not communicate with the reduced pressure zone of the peripheral second cylinder. On the other hand, the reduced pressure zone of the peripheral second cylinder communicates with the volume V surrounding the end of the body opposite that provided with the check valve.

When the plunger piston rises, the metering seals J1 and J93 being closed when they are moved away from the check valve, the seal J1 activates the reduced pressure zone of the first cylinder by lowering the pressure, which generates suction of the metered product. Concomitantly, the seal J93 activates the reduced pressure zone of the second cylinder by lowering the pressure, which generates suction of water circulating through the hydraulic machine M into the reduced pressure zone of the second cylinder via the interstice delimited by the two nested tubes 102a, 102b.

Remember that the metering mechanism, the volume V of which surrounds the end of the body opposite that provided with the check valve, communicates with the driving part.

When the plunger piston descends, the seal J93 opens, thus enabling the metered product and the water to pass through it and access the volume V. Where the volume of metering product contained inside the central first cylinder is concerned, either it passes through the seal J1 now open and passes also through the V seal J91, or it passes only through the V seal J91, the seal J1 remaining closed.

Figure 8B:
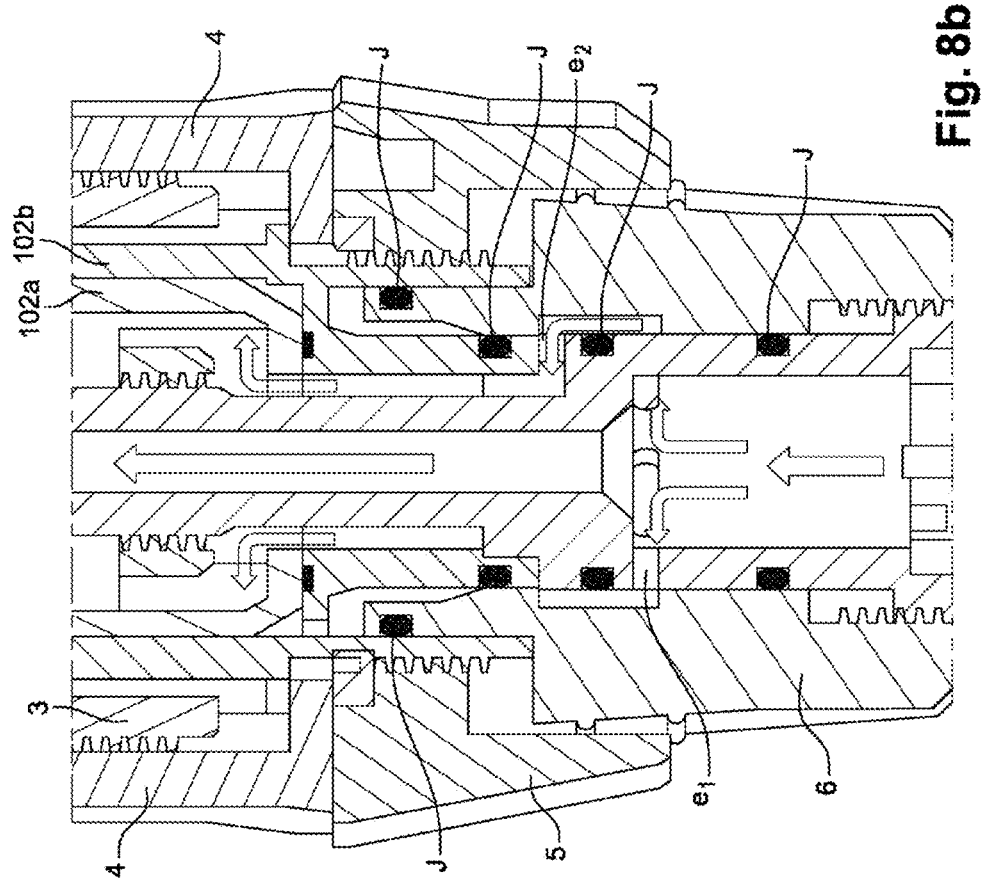
Figure 8A:
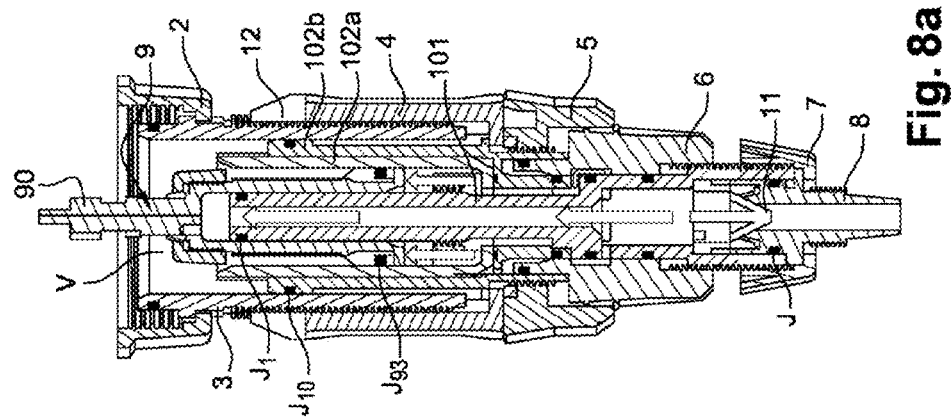
FIG. 8a is a view in longitudinal section of a metering mechanism according to FIG. 4b in a mode of operation dedicated to large metered amounts.

When the selector is set to the higher metered quantities range Y %-Z %, and referring to FIGS. 8a and 8b, the selector 6 is in the position in which the communication e1 between the reduced pressure zones of the first and second cylinders is open while the communication e2 between the reduced pressure zone of the second cylinder and the volume surrounding the end of the body opposite that provided with the check valve is closed.

The reduced pressure zone of the central first cylinder then communicates with the reduced pressure zone of the peripheral second cylinder. On the other hand, the reduced pressure zone of the peripheral second cylinder no longer communicates with the volume V surrounding the end of the body opposite that provided with the check valve.

When the plunger piston rises, the metering seals J1 and J93 being closed when they are moved away from the check valve, the seal J1 activates the reduced pressure zone of the first cylinder by lowering the pressure, which generates suction of the metered product. Concomitantly, the seal J93 activates the reduced pressure zone of the second cylinder by lowering the pressure, which also generates suction of the metered product because the reduced pressure zones communicate via the opening e1. On the other hand, there is no suction of water circulating through the hydraulic machine M because the communication is closed. Remember that the metering mechanism, and in particular the volume V surrounding the end of the body opposite that provided with the check valve, communicate with the driving part, that is to say with the hydraulic machine.

When the plunger piston descends, the seal J93 is opened, thus enabling the metered product to pass through it and to access the volume V. The product to be metered contained inside the central first cylinder for its part passes through the V seal J91.

By way of illustration, the invention must be able to cover a metering range extending from 1 to 10%. It is then possible to define a first metering subassembly covering the metering range from 3 to 10%, with a metering body diameter of 34.5 mm, and a second metering subassembly with a metering body diameter of 18 mm to cover the metering range from 1 to 3%.

FIG. 9 presents results of test throughout the metering range from 1 to 10% under conditions of 0 pressure, 3 bar pressure and 6 bar pressure, and with flow rate variations from 0 to 2500 l/hour.

It is seen each time that the metering errors are contained within +/−10% of the nominal value.

When the selector includes on its exterior surface first and second markings, the first and/or second markings is (are) associated with detection means so as to determine the position of the selector. Accordingly, and as represented in FIGS. 10a and 10b, it is possible to provide a magnet 63 inside the selector, for example, that magnet being associated with the first position, and therefore with the first marking.

Accordingly, when the pump is used under the control of a monitoring device, said device is able to determine the position of the magnet and consequently that of the selector. Although the magnet constitutes a robust and relatively low cost detection means, it is easily possible to use other means such as an RFID tag.

Of course, the invention is not limited to the examples that have just been described and numerous modifications may be made to those example without departing from the scope of the invention. Moreover, the various features, forms, variants and embodiments of the invention may be associated with one another in various combinations provided that they are not incompatible or mutually exclusive.

The invention claimed is:

1. A metering mechanism, comprising:
   a jacket (3) mounted in an adjusting sleeve (4);
   a metering body (10) mounted to move in translation in the jacket (3), said adjusting sleeve being adapted to cooperate by way of a screwing movement with said jacket, and the screwing movement driving the metering body in translation,
   said metering body being provided at a first end thereof with a shut-off check valve (11) and accepting at a second end thereof a plunger piston (9), an alternating movement in translation of said plunger piston generating a suction at a level of the first end of the metering body and then expulsion into a volume (V) surrounding the second end of the metering body via a passage formed in at least one sealing device (J1, J93, J91),
   the metering body including a central first cylinder (101) and a peripheral second cylinder (102) that are concentric and fastened to one another,
   the plunger piston being fastened to a first sealing device (J1) and a second sealing device (J93) respectively mounted to bear against the first and second cylinders, so that a reduced pressure zone is created inside the first and second cylinders, respectively, when the first and second sealing devices (J1, J93) are moved away from the end of the body provided with the check valve,
   the reduced pressure zone of the central first cylinder being adapted to communicate with the reduced pressure zone of the peripheral second cylinder, and the reduced pressure zone of the peripheral second cylinder being adapted to communicate with the volume (V) surrounding the second end of the metering body; and
   a selector (6) mounted on the central first cylinder and mobile relative thereto over a stroke delimited by a first position, in which a first communication (e1) between the reduced pressure zones of the first and second cylinders is cut off while a second communication (e2) between the reduced pressure zone of second cylinder and the volume (V) surrounding the second end of the metering body is open, and a second position, in which the first communication (e1) between the reduced pressure zones of the first and second cylinders is open while the second communication (e2) between the reduced pressure zone of the second cylinder and the volume (V) surrounding the second end of the metering body is cut off,
   wherein the passage formed in the at least one sealing device (J1, J93, J91), which enables expulsion into the volume (V) surrounding the second end of the metering body, is provided at one of i) a level of the second sealing device (J93), said second sealing device (J93) being a seal that opens when the plunger piston (9) moves toward the check valve, or ii) a level of a lip seal (J91) mounted on the plunger piston (9), said lip seal (J91) being open when the plunger piston moves toward the check valve.

2. The metering mechanism as claimed in claim 1, wherein the plunger piston comprises a rod (90) that extends from a third cylinder (91), said third cylinder (91) positioned between the central first cylinder (101) and the peripheral second cylinder (102), the second sealing device (J93) being mounted on an ire exterior circumferential surface of the third cylinder.

3. The metering mechanism as claimed in claim 2, wherein the first sealing device (J1) is mounted on an interior circumferential surface of the third cylinder.

4. The metering mechanism as claimed in claim 2, wherein the first sealing device (J1) is mounted on an extension of the rod (90) of the plunger piston so as to come to bear against an interior circumferential surface of the central first cylinder (101).

5. The metering mechanism as claimed in claim 1, wherein the second communication (e2) is provided by at least one channel (102c) hollowed out within the thickness of the peripheral second cylinder and connecting said reduced pressure zone and said volume.

6. The metering mechanism as claimed in claim 1, wherein the second communication (e2) is produced by an interstice delimited by two nested tubes (102a, 102b) constituting the peripheral second cylinder (102).

7. The metering mechanism as claimed in claim 1, wherein the first communication (e1) is produced by means of at least one opening within a thickness of the central first cylinder.

8. The metering mechanism as claimed in claim 1, wherein the first and second positions delimiting the stroke of the selector are respectively defined by abutment surfaces of an element (5) that operates upon the adjusting sleeve (4) and an assembly nut (7).

9. The metering mechanism as claimed in claim 8, wherein the selector (6) is mounted to move in translation along the central first cylinder and is formed as a nut that cooperates with a screwing movement with a threaded zone provided on an exterior circumferential surface of the central first cylinder,
   so that the first position in which the first communication (e1) is cut off while the second communication (e2) is open corresponds to a screwed-in in position of the nut, and
   so that the second position in which the first communication (e1) is open while the second communication (e2) is cut off corresponds to a screwed-out position of the nut.

10. The metering mechanism as claimed in claim 8, wherein the selector (6) is formed as a ring mounted on the central first cylinder with a sliding connection.

11. The metering mechanism as claimed in claim 8, wherein the selector (6) is a device comprising a relief valve (60) and a selector seal that are controlled manually by rotation of a ring over a stroke of the ring that extends over one half-turn, said relief valve establishing communication at a first end of the stroke of the ring between the reduced pressure zones of the first and second cylinders while the selector seal shuts off the communication between the reduced pressure zone of the second cylinder and the volume surrounding the second end of the metering body, and vice versa at the other end of the stroke of the ring.

12. The metering mechanism as claimed in claim 8, wherein the selector (6) is a device comprising a hydraulic slide (61) mobile in translation, a slot (62), and a selector seal, the hydraulic slide establishing communication at a first end of a stroke of the slide between the reduced pressure zones of the first and second cylinders via the slot while the selector seal shuts off the communication between the reduced pressure zone of the second cylinder and the volume surrounding the second end of the metering body, and vice versa at a second end of the stroke of the slide.

13. The metering mechanism as claimed in claim 1, wherein the selector includes on an exterior surface thereof first and second markings respectively corresponding to the first and second positions delimiting the stroke of the selector.

14. The metering mechanism as claimed in claim 13, wherein at least one of the first and the second markings are associated with detection means (63) in such a manner as to determine the position of the selector.

15. A proportioning pump comprising a hydraulic machine (M) provided with an inlet (E) and an outlet (S), and a metering mechanism (D) communicating at a first end thereof with an access tube (1) to an interior mixing chamber of the pump and at a second end thereof with a reservoir of product to be metered, the hydraulic machine extending along a longitudinal axis (Z) and enclosing a member adapted to effect an alternating movement, the feeding of the pump with liquid at the inlet triggering the alternating movement of the member, said alternating movement alternately bringing about suction via the metering mechanism into the mixing chamber with opening of a suction check valve (11) when the member moves away from the metering mechanism and then expulsion at the outlet of the pump with closure of the suction check valve when the member moves toward the metering mechanism, characterized in that the metering mechanism is as claimed in claim 1.

16. A method of using a proportioning pump as claimed in claim 15, the selector including on an exterior surface thereof first and second markings respectively corresponding to the first and second positions delimiting the stroke of the selector, said first and second positions respectively corresponding to metering values between X % and Y % inclusive and to metering values between Y % and Z % inclusive, Y lying between X and Z, a jacket of the metering mechanism including a graduation corresponding to metering values, characterized in that the method comprises:
 a step of selection of the metering range (X %-Y %) or (Y %-Z %) by positioning the selector in one or the other of the first and second positions delimiting the stroke of the selector,
 and then a step of selection of the metering value by adjusting the sleeve (4) to the chosen metering value.

* * * * *